United States Patent [19]

Chambers

[11] Patent Number: 4,720,871

[45] Date of Patent: Jan. 19, 1988

[54] DIGITAL IMAGE CONVOLUTION PROCESSOR METHOD AND APPARATUS

[75] Inventor: James M. Chambers, Carlsbad, Calif.

[73] Assignee: Hughes Aircraft Company, Los Angeles, Calif.

[21] Appl. No.: 873,903

[22] Filed: Jun. 13, 1986

[51] Int. Cl.$^4$ ................ G06K 9/36; G06F 15/336
[52] U.S. Cl. ................................. 382/42; 382/41; 364/604; 364/728; 364/819; 358/37; 358/166
[58] Field of Search ................ 382/42, 54, 41; 358/166, 167, 37; 364/819, 728, 604

[56] References Cited

U.S. PATENT DOCUMENTS

| | | | |
|---|---|---|---|
| 4,330,833 | 5/1982 | Pratt et al. | 382/42 |
| 4,623,923 | 11/1986 | Orbach | 382/42 |
| 4,694,407 | 9/1987 | Ogden | 364/728 |

Primary Examiner—James J. Groody
Assistant Examiner—Michael D. Parker
Attorney, Agent, or Firm—Joseph E. Szabo; Anthony W. Karambelas

[57] ABSTRACT

A method and apparatus for processing digital data representative of a digital array of points of a source image including a source image memory (12) or digitized camera (40) for providing a source image as a digital array of points, with provision for generating an end of array, or end of frame signal, (32) each time that the array has been computationally adjusted and transferred to a destination image memory. A control processor (14) includes a convolution kernel algorithm having the elements thereof configured for establishing a computational sequence or offset (18, 10) for each point in the array relative to a reference point, with each element having a constant value for computational adjustment of the array for each frame time represented by that element. The computational logic (21, 22, 24) is responsive to the control processor (14) for mathematically manipulating each point of the source image digital array for transfer to the destination image memory (14) in a position spatially related to the source image array. Each end of array signal enables the control processor to reset to the next element of the convolution kernel to establish a new constant and new offset for subsequent iterative computational processing, and combining with the adjusted value in the destination image memory (24), with the total number of iterations determined by the number and values of the computational values whereby the source image array is transformed into an array of digital values in the destination image memory representative of a convolved image.

23 Claims, 8 Drawing Figures

| $K_{11}$ | $K_{21}$ | $K_{31}$ |
| --- | --- | --- |
| $K_{12}$ | $K_{22}$ | $K_{32}$ |
| $K_{13}$ | $K_{23}$ | $K_{33}$ |

DIGITAL IMAGE CONVOLUTION PROCESSOR METHOD AND APPARATUS

BACKGROUND OF THE INVENTION

The background of the invention will be discussed in two parts.

1. Field of the Invention

This invention relates to digital image processing, and more particularly to a convolution processor for digital image processing.

2. Description of the Prior Art

Modern technology utilizes all types of pictures, or images, as sources of information for interpretation and analysis. While some interpretation and analysis can be done by visual or optical means, a greater volume can be performed much faster and more accurately through use of a high speed computer. This requires that the image, in whatever original form, be placed in a digital form suitable for processing to obtain the desired analysis. Once digitized, the data representative of the image may be readily processed electronically to perform a number of different operations on the data, for providing another image, stressing certain aspects of the original image which has been operated upon. Typical digital image processing operations include image enhancement, such as when the original image is lacking in definition due to focusing problems, or the like; contrast enhancement, in which the digitally created image provides greater contrast, or brightness differences, between adjacent objects of the original image; or edge enhancement, in which the edges surrounding the various objects and features of the original image are stressed in the created image.

The typical original image, in most instances, is a "black and white" image; that is, for example, a photograph having black, white and varying shades of gray, which collectively depict an image. Color images may likewise be processed, although the digital data requirements are obviously different, if data indicative of color is included. Other examples of digital image processing may include images out of the visible region, such as infrared and radar images, in which the original image may be a digital image which is suitably processed to reduce noise, for example.

In any event, it is ultimately desired to display an image on a display screen, or in some other visible form, with the ultimate or created image having, for example, the contrast enhanced, the edges enhanced, or the noise removed, or substantially reduced. Furthermore, the processed image may also be used in higher level computational processors, and need not necessarily be viewed. Digital image processing is generally accomplished on a point by point, or pixel by pixel, basis; that is, each pixel of the original image, in digital form, is evaluated, interpreted, analyzed and processed in accordance with a predetermined method intended to accomplish the ultimate objective on the created image.

Since pixels of an original image may be readily identified on a coordinate basis, that is on an X-axis, Y-axis coordinate reference with respect to the matrix of pixels in the image, the original digital data generally takes the form of information relating to the X, Y position and a digital number representative of some characteristic or attribute of the gray level of the particular pixel, with values of 0 to 255 typically being assigned for gray shades where 0 is black and 255 is white. A pixel matrix for a display may be, for example, 512 by 512, that is 262,144 pixels on the display. Other matrix arrangements may be used, such as 640 columns by 480 rows, or any other arrangement. In some processes, where a video display is used, X, Y coordinate information is not required, and pixel positions may be designated or located relative to an event, such as positions following a retrace signal. In any event, in a typical image processing system, digital data representing each pixel is stored in a source image memory from which it can be computationally adjusted, pixel by pixel, for transfer to a destination image memory, which stores the adjusted result, usually in the same spatial orientation as the original image. The results so stored may be further modified until the completion of the manipulation to produce the ultimate processed image on a display. Since the process frequently involves a display, the computations are often conveniently performed at raster scan rates and in a format consistent with raster scan display.

For digital image processing, depending on the particular end objective, such as edge enhancement, noise reduction, etc., the data representing each pixel may be digitally manipulated by multiplication, addition, subtraction and the like, to place the original data from the source memory into an adjusted format in the destination memory for accomplishing the ultimate objective. In some other systems of image processing by use of digitally represented pixel information, certain non-linear mathematical processing is performed on the data base for image enhancement, or extraction of data of particular significance. For many commonly used enhancement purposes, each pixel of the enhanced image, hereinafter called the "enhanced object pixel", is extracted from an area of the original image involving that pixel of the original image, hereinafter called the "source object pixel", and each of the neighboring pixels surrounding it, that is in both the $+/-$ X-axis and $+/-$ Y-axis directions. For this purpose, again determined by the end objective, a "kernel" may be utilized, with the kernel being a computational array of coefficients or values best intended to accomplish the end result. These coefficients are arithmetically applied to gray level values of the object pixel and its neighbors. A $3 \times 3$ kernel may be used, for example, having three rows and three columns of assigned values, that is, nine values. Other kernels may be employed, for example, $5 \times 5$ or $21 \times 21$. Commencing at a given pixel location, for example, the first row and first column, the processing to obtain the modified value for each enhanced object pixel involves mathematical manipulation or adjustment of the data representative of each source object pixel and its eight surrounding neighbors, by nine respective assigned kernel values (in the case of a $3 \times 3$ kernel). Interim results are obtained, which may be further processed to obtain final results, which are suitably displayed or stored, and, in effect, are the processed image desired. This process is referred to as spatial filtering, image convolving or image convolution.

For one particular method of image convolution, in a typical prior art hardware mechanization, the system utilizes a "brute force" method of an array of multipliers and adders, operating in parallel on each row and column of pixels. To convolve an image having a pixel array with dimensions I by J, and with a convolution kernel having dimensions M by N requires $I \times J \times M \times N$ multiplications and additions. Typically, I and J are 512, and M and N are 3, requiring $512 \times 512 \times 3 \times 3$, or approximately 2,360,000 multiplies and adds. In such a typical hardware implementation, with a 3×3 kernel, this is conventionally accomplished with 9 multipliers, 9 adders and 3 line buffers, and performs the convolution in one raster frame time. Once implemented for a particular kernel size and shape, the hardware is set to that M×N kernel, and cannot be readily reconfigured for other sizes and shapes of kernels.

A hardware intensive approach to digital image processing is exemplified by U.S. Pat. No. 4,464,788, issued to Sternberg, et al on Aug. 7, 1984, such patent being entitled "Dynamic Data Correction for an Image Analyzer System". At the other end of the spectrum are those systems which are software intensive, which provide a high degree of flexibility with an inherent lack of speed. One such image processing system utilizing digital filtering techniques is shown and described in U.S. Pat. No. 4,330,833, issued May 18, 1982 to Pratt et al., such patent being entitled "Method and Apparatus for Improved Digital Image Processing".

On the one hand, hardware implementation, while obviously high speed, has a corresponding lack of economy and flexibility. Moreover, a change in the kernel size and shape cannot be readily accomplished, particularly if a desired kernel structure falls outside the matrix of the original kernel for which the hardware was configured. On the other hand, intensive software implementation has high flexibility and economy, while suffering from slow speed, particularly where a kernel size and shape is complex.

SUMMARY OF THE INVENTION

In accordance with the present invention, as implemented in a preferred embodiment, a convolution processing method and system are provided in which a convolution kernel of a selected number of elements is established in size and shape as a contiguous or noncontiguous matrix of numerical or constant values, with the shape or positional relation of the elements of the convolution kernel defining and X-axis and Y-axis offset sequence for the pixel data pertaining to a reference point or object pixel of the digital source image. In accordance with a timing sequence, preferably at video processing rates, for each raster frame time the data for each pixel of the original image is computationally adjusted, such as by being multiplied by a constant value of an element of the convolution kernel corresponding to a given image offset for that element, and summed with a resultant value then being stored in a storage location in a destination image memory spatially corresponding to the reference pixel location. The result is then returned to the same location in the destination image memory. Subsequent sequential iterative processing is performed in subsequent frame times with an offset of the source image array relative to a destination image memory. In one embodiment, the source image is contained in a source image memory, with X-axis pixel offset, and Y-axis pixel offset corresponding to the location of the appropriate constant value from the convolution kernel being effected in the source image memory relative to the destination image memory under control of a control processor in response to completion of a frame. In an alternate embodiment, the source image is received from a digital source, such as a digitized camera, and the X-axis and Y-axis pixel offsets corresponding to the appropriate constant value from the convolution kernel offset the pixel locations in the destination image memory relative to the fixed source image array under control of the control processor. The number of frame times for convolving an image is determined by the number of constants in the convolution kernel. The convolved image may be displayed on a monitor or further processed off line or both.

DETAILED DESCRIPTION OF THE INVENTION

Figure 1:
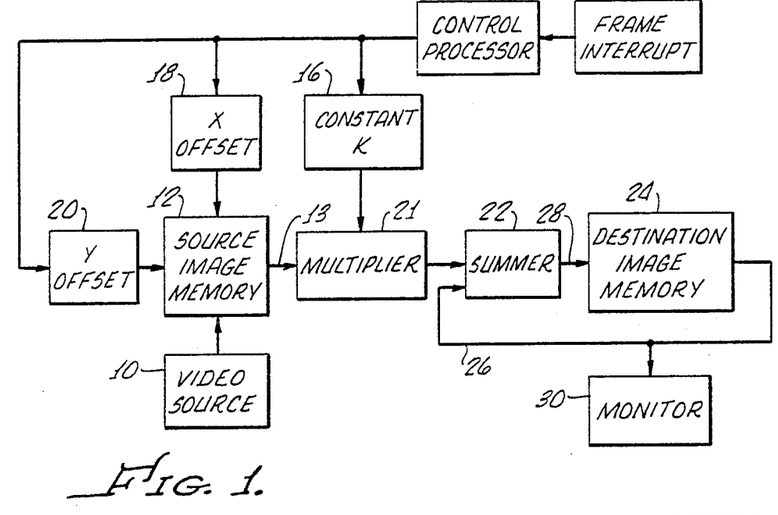
FIG. 1 is a block diagram of a digital image convolution processing system.

Referring now to the drawings, and particularly to FIG. 1, there is shown a digital image processing system, in which information from a video source 10 is transferred, in digital form to a source image memory 12, where each memory storage location initially contains digital information representative of the characteristics of a given point or pixel of the digital array of the original image. A control processor 14 generates or transfers preestablished signals, in appropriate format and sequence, to provide a kernel constant value to a constant register 16, an X-axis value to X-axis offset register 18, 18, and a Y-axis value to Y-axis offset register 20. The control processor 14 may be, for example, a general purpose high speed computer, programmable for different coefficient values of the constants within the kernel, and likewise programmable for varying the X-axis and Y-axis offsets in accordance with any predetermined algorithm.

As will be described more fully hereinafter, the X-axis offset register 18 and the Y-axis offset register 20 shift the matrix array of digital data representative of pixel values within the source image memory 12 in a predefined manner. The output of the digital values for each point in the array of the source image memory 12 then provides an input to a multiplier 21 over line 13, which multiplies these values by the value of the constant within the kernel constant register 16. The output of the multiplier 21 is then summed in a summer 22 with a value received via line 26 and previously stored within a destination image memory 24. The sum is then transmitted over line 28 back to a particular storage location in the destination memory 24 corresponding to the memory location from which the value on line 26 was taken. The results within destination memory 24 during the interim computations may, but need not, be displayed after proper conditioning, on the monitor 30 coupled to the output thereof. Upon conclusion of a predetermined number of computational interations, the destination image memory 24 will contain, in point to point correlation with the source image array in memory 12, an adjusted set of values, in digital form, representative of the processed image.

Although any timing sequence may be employed, with a video source 10 and a video monitor 30 the signals transmitted and the controls effected are often most conveniently accomplished with reference to the video raster timing and format, with updating or incrementing of the algorithm within the control processor being accomplished in response to a display vertical retrace, or "frame interrupt" signal 32. Effectively, the frame interrupt signal 32 is a signal indicative of the end of an array, that is each point of the digital array of the source image will have been computationally adjusted one time, with the resultant digital values stored in spatially related storage locations in the destination image memory 24.

As will hereinafter be described, the convolution process utilizing the system of FIG. 1 accomplishes the same result as the prior art hardware image processing system previously referred to, with the salient difference that the instant system requires only one multiplier and one adder, whereas the prior art hardware system required nine multipliers, nine adders and three buffers for a convolution kernel of $3 \times 3$ dimension. While the hardware image processing system is capable of performing the convolution in one raster frame time, the system of the instant invention, for a $3 \times 3$ convolution kernel, requires nine raster frame times. However, as previously noted, the hardware system, once constructed for a $3 \times 3$ kernel, has no flexibility beyond that matrix, whereas the instant system may readily accommodate any kernel size (number of elements) and shape (spatial relation of each kernel element relative to the next).

On a time basis, with display video normally requiring thirty frames per second to eliminate the appearance of a flickering image, a frame time generally corresponds to about one-thirtieth of a second, that is less than $33\frac{1}{3}$ milliseconds. Nine frame times (for a $3 \times 3$ convolution kernel) then approximates 300 milliseconds, which is the amount of time involved to produce a $3 \times 3$ convolved image in accordance with the present invention.

Figures 2, 3:
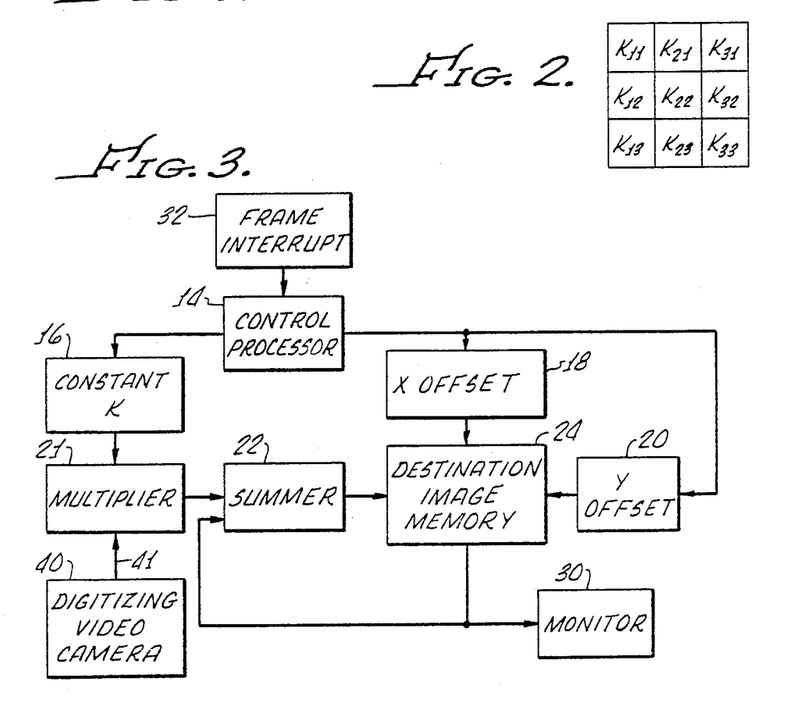
FIG. 2 is a symbolic depiction of a 3×3 convolution kernel for use in the processing system of FIG. 1.
FIG. 3 is a block diagram of an alternate embodiment of the system of FIG. 1, using a digitizing video camera as the source image.

By reference to FIG. 2, there is symbolically depicted a $3 \times 3$ convolution kernel, wherein each element within the kernel is contiguous to another element, with each element being designated by a small letter "k" followed by a two-digit subscript, with the first digit corresponding to the vertical column, and the second digit corresponding to the horizontal row, these subscripts being selected for ease of discussion. Each of these elements of the convolution kernel, i.e, $k_{11}$, $k_{21}$, ... $k_{33}$, in one instance, represents a numerical coefficient or value, which is hereafter referred to as a constant, or kernel constant, the value of which is to be sequentially entered into the constant register 16 by the control processor 14 under control of the "frame interrupt" signal 32. Each of these kernel constants, in turn, is used as a multiplier constant within the multiplier 21 for sequential computational adjustment of the digital values representative of each point or pixel of the string or array of source image data entering the multiplier 21 over line 13 from the source image memory 12. The derivation of the particular kernel element constants employed may be by any number of well-known techniques which are, in large part, determined by the particular type of processing desired, e.g., edge enhancement, noise filtering, etc., and the actual numbers or values derived are not necessary to an understanding of the invention. It is to be emphasized that the coefficients or kernel element constant values for a given convolution kernel may be positive or negative, may be integers or non-integers, may be zero, and may even include the same value as other constants in a given convolution kernel. A description of techniques of digital image processing and establishment of kernel element values for particular processing methods may be found in the text *Digital Image Processing*, by William K. Pratt, published 1978 by John Wiley & Sons, Inc.

The digital values within the source image memory 12 are unprocessed raster formatted digital data, representing pixel brightness or intensity information, which is passed through the system at video rates. With a $512 \times 512$ image pixel array, and with a video raster scan, the array of digital data from the source image memory 12 will be transferred out one pixel or point at a time for processing, with the entire content of the source image memory 12 being mathematically manipulated or computationally adjusted each raster frame time during a given offset of the source image relative to the destination image memory 24. For each of the subsequent frame times, the source image array will be shifted by a unique set of offsets, with the value of the offset pixel thereof again computationally adjusted until, after nine raster frame times, there will be produced the ultimate convolved image in digital form within the destination image memory 24. The destination image memory 24 operates as a read-modify-write memory, that is, stored data in the destination image memory 24, representing partially processed convolved images, is read, modified in the summer 22, and rewritten in the memory 24. As will be described, on each "pass", that is, each iterative sequence of manipulation of the data from the source image memory 12, interim digital results are obtained and stored in the destination memory 24, until the final pass, that is, the ninth raster frame time, for a $3 \times 3$ kernel.

Referring again to FIG. 2, it can be seen that the kernel location for kernel element $k_{22}$ is the center of the $3 \times 3$ convolution kernel. This matrix or convolution kernel can be spatially related to an image array of pixels of $3 \times 3$ dimension. The center kernel element $k_{22}$ correlates to the center pixel or point of a $3 \times 3$ image array of pixels, in which pixel positions of the source image array will be offset relative to the enhanced object pixel in predetermined amounts, which are established by the shape and size of the kernel. Offsets are determined as a function of the shape of the convolution kernel, and as a function of the kernel element of interest, that is the center kernel element.

Thus, the convolution kernel, such as the kernel of FIG. 2, provides the basis for two essential requirements in the convolution process. Not only does the kernel provide, for each kernel element, a coefficient or constant value for multiplication, but the position of each kernel element of the convolution kernel relative to the object pixel, in a given predetermined pattern. In effect, with the kernel of FIG. 2, the center kernel element $k_{22}$ spatially depicts the center pixel of a $3 \times 3$ image array of pixels, which is the pixel of interest about which the offsetting of the pixel array for computational purposes is accomplished.

In a broad aspect, the apparatus and method described herein achieve convolution processing of a source image comprising an array of pixels, by a processing of each pixel of the array. The specific processing is dictated by the several elements of the convolution kernel. The elements of the convolution kernel are employed one at a time, to go through the entire array with each. In other words, for each kernel element the entire source array is processed to create in the destination image a complete but only partially convolved image, until the final kernal element is processed. The processing of the complete array is repeated a number of times equal to the number of elements in the kernel, using a different kernel element for each repetition or iteration. Upon each iteration of the processing of a complete array, all pixels in the destination image are modified according to one and only one of the kernel elements to provide an updated but still only partially convolved image, until, of course, the final iteration of the processing of the entire array has been accomplished.

The processing of each pixel of the array for any given processing frame (a processing frame may be defined as a single iteration of the processing of all pixels of the source array according to the offsets and constants of a single kernel element) basically involves use of a number of neighboring pixels. In a general aspect of convolution processing, for a given pixel, (a) one looks at a group of neighboring pixels (where the particular neighboring pixels are selected by the x,y offsets of the particular convolution kernel being employed), (b) modifies the intensity (for example) values contained in the neighboring pixels, (c) sums such modified values with the values in the destination image corresponding to the given pixel, and (d) stores the sum back in the pixel of the destination image. The apparatus and method disclosed herein provide a particular method and apparatus for convolution processing. For any one processing frame in the disclosed method and apparatus, a given source image pixel has the value of only a single one of its neighbor pixels modified, with the result of such modification being summed and stored in the corresponding location of the destination image. Each pixel of the source image is handled in a similar fashion in the one processing frame, using only a single kernel element for any one processing frame. In other words, the one neighbor of the given pixel, offset by the then operative kernel element's x,y offsets has such neighbors' value modified by the then operating kernel element constant with the product being added to the value of the corresponding destination image pixel and the resulting sum stored in the same destination image pixel location. The processing frame is repeated a number of times equal to the number of kernel elements. For each subsequent processing frame, a different kernel element is employed for all pixels of the image.

Specifically, the steps in the method are as follows (with reference to parameters shown in TABLE I below):

1. Frame 1: Establish a kernel offset $(-1,-1)$ for the first kernel element) and a kernel value constant ($k_{11}$ for the first kernel element).
2. Select a pixel ($S_{i,j}$) of the source image array.
3. Read the intensity value ($I_{i-1,j-1}$) of a neighbor or offset pixel ($S_{i-1,j-1}$) which is offset from the given pixel ($S_{i,j}$) by the kernel offset $(-1,-1)$.
4. Multiply the intensity value ($I_{i-1,j-1}$) by the kernel value ($k_{11}$)
5. Add the product of the previous step to the intensity value contained in the destination pixel $D_{i,j}$ which corresponds to the source image pixel being processed.
6. Store the sum of the previous step in the destination image location $D_{i,j}$ (thereby replacing the intensity value previously stored in $D_{i,j}$).
7. Select the next pixel of the source image array and repeat steps 3 through 6. This is done for the very same first kernel element including its same offsets $(-1,-1)$ and kernel value $k_{11}$.
8. Repeat step 7 until all pixels have been processed.
9. When all pixels of the array have been processed, generate an end of frame signal (which starts Frame 2), and repeat step 1 to establish, for all of Frame 2, the next kernel offset $(0,-1)$ for the second kernel illustrated as occurring in processing Frame 2 of the TABLE I below).
10. Using the offsets $(0,-1)$ of the second kernel element and also using the kernel value $K_{21}$ of the second kernel element repeat steps 2 through 9.
11. Repeat all of steps 1 through 10 for each subsequent kernel element until all kernel elements have been employed in the process.

Set forth below is Table I, which correlates the pixel offset to the kernel constant of the convolution kernel of FIG. 2 according to each pass or frame time:

TABLE I

| Frame k | | X offset (pixels) | Y offset (pixels) | $D_{i,j}(T)$ |
|---|---|---|---|---|
| 0 | — | — | — | 0 |
| 1 | $k_{11}$ | $-1$ | $-1$ | $k_{11}S_{i-1,j-1} = D_{i,j}(1)$ |
| 2 | $k_{21}$ | 0 | $-1$ | $k_{21}S_{i,j-1} + D_{i,j}(1) = D_{i,j}(2)$ |
| 3 | $k_{31}$ | $+1$ | $-1$ | $k_{31}S_{i+1,j-1} + D_{i,j}(2) = D_{i,j}(3)$ |
| 4 | $k_{12}$ | $-1$ | 0 | $k_{12}S_{i-1,j} + D_{i,j}(3) = D_{i,j}(4)$ |
| 5 | $k_{22}$ | 0 | 0 | $k_{22}S_{i,j} + D_{i,j}(4) = D_{i,j}(5)$ |
| 6 | $k_{32}$ | $+1$ | 0 | $k_{32}S_{i+1,j} + D_{i,j}(5) = D_{i,j}(6)$ |
| 7 | $k_{13}$ | $-1$ | $+1$ | $k_{13}S_{i-1,j+1} + D_{i,j}(6) = D_{i,j}(7)$ |
| 8 | $k_{23}$ | 0 | $+1$ | $k_{23}S_{i,j+1} + D_{i,j}(7) = D_{i,j}(8)$ |
| 9 | $k_{33}$ | $+1$ | $+1$ | $k_{33}S_{i+1,j+1} + D_{i,j}(8) = D_{i,j}(9)$ |

Where $S_{ij}$ is the value of the source image memory pixel having coordinates X=i and Y=j, and $D_{ij}(T)$ is the value of the destination image memory pixel having coordinates X=i and Y=j at the end of frame T.

The above equations simply state that for each frame time, with the array offset as established, the digital value of every pixel or point in the digital image array of the source image memory 12 is, in sequence, multiplied by a given one of the convolution kernel constants corresponding to that offset, and added to a previously accumulated interim result in the location of the destination image memory 24 spatially corresponding to a like location in the source image memory 12. The following is a summary of the sequence of operation of the system of FIG. 1.

At frame 0, the destination memory 24 is initialized or reset, so that all destination memory storage locations are at zero. At this point, the array of points in the source image memory 12 has not been shifted.

Upon receipt of an end of array or vertical retrace or "frame interrupt" signal 32, the control processor 14 then sets the signals to the constant register 16, the X-offset register 18 and the Y-axis offset register 20 to the values established in the second, third and fourth columns, respectively, of Table I, corresponding to Frame 1.

During Frame 1, each pixel or point location of the digital array of the source image memory 12 is offset negatively one pixel location relative to a reference pixel position in location i, j, in both the X-axis and Y-axis directions. This offset shifts the entire array as an array. The digital value of each shifted pixel ($S_{i-1,j-1}$) of the source image memory 12 is then sequentially multiplied by kernel constant $k_{11}$ in the multiplier 21. The output of the multiplier 21 is then summed in summer 22 with the corresponding value in pixel location ($D_{i,j}$) in destination image memory 24, which had been originally set to zero in frame 0. This results in a transfer of the now-shifted multiplied pixel data from the source image memory 12 to the destination image memory 24. The interim result from summer 22 is then stored in the destination image memory 24 at a predetermined destination image memory 24 location $D_{i,j}$, spatially corresponding to source image location $S_{i,j}$ (the reference or center pixel of a pixel image array), and is indicated in the last column to the right of the equal sign of Table I. As will become obvious, the result in location i, j of the destination image memory 24 will be computationally adjusted and updated through all nine frame times until after nine frame times, the destination image memory 24 will contain a transformed digital array of resultant values desired for the so-convolved image on a one-to-one spatially correlated basis with the original source image array.

Upon receipt of a vertical retrace or "frame interrupt" signal 32, indicating the end of transfer of an array of digital values of the source image, the control processor 14 resets the signals to the constant register 16, the offset value to the X-offset register 18 and the offset value to the Y-axis offset register 20 to the values established in the second, third, and fourth columns, respectively, of Table I, corresponding to Frame 2.

During Frame 2, each pixel location of the digital array of the source image memory 12 is offset by the amount shown in Table I for Frame 2. In this case, there is no offset in the X-axis direction and a negative offset of one pixel location in the Y-axis direction. It is to be emphasized at this point, that the X-axis and Y-axis offsets herein referred to are with reference to the pixel locations of the original source image and are not cumulative offsets with respect to the offsets of the previous frame. A new kernel constant corresponding to the value of kernel element $k_{21}$ is then entered into register 16 and used as a sequential multiplier in multiplier 21 for the digital data values of all pixel locations in the shifted source image memory 12. The result of the multiplication of the digital value of each shifted point ($S_{i,j-1}$) in the source image array is then summed in summer 22 with the digital value contents of the destination image memory 24 contained in location i, j, which is the interim result obtained during the preceding frame. This readjusted digital value is then returned for storage at location $D_{i,j}$ of the destination image memory 24.

The process is then iteratively repeated for each succeeding frame, during which offsets of the digital values in the source image array in memory 12 are effected, the digital value of each point in the array is adjusted, and the adjusted value is combined with a value in a storage location in destination image memory 24 corresponding to the storage location of the unshifted source image memory 12. As a consequence, each frame time, the digital value of every pixel of the source image are multiplied by one of the convolution kernel constants and added to the previously accumulated interim result. After the conclusion of nine frame times, the resultant value, represented as $D_{i,j}(9)$ effectively contains the array of computationally adjusted digital values for each pixel location indicative of the resultant convolved image. The ultimate results may then be displayed on the video monitor 30 to produce a visual display of the convolved image, which may be an edge enhanced image or the like, or may be presented to another processor for additional higher level processing, or may be reprocessed in the same processor using the same technique described herein in a recursive fashion.

It will become readily apparent to one skilled in the art that the offsetting can be alternatively accomplished in the destination image memory relative to a fixed location of the source image. FIG. 3 depicts an alternate embodiment of a convolution processor system, in which the source image is not stored in a memory, but is obtained by means of a digitizing video camera 40. The various blocks in FIG. 3 bear the same reference numerals as the blocks in FIG. 1 with which they correspond functionally. Briefly, in the embodiment of FIG. 3, the source image data originating over line 41 from the digitizing video camera 40 is sequentially multiplexed, pixel by pixel, over each frame time by a constant kernel value, and then summed with the resultant data in a spatially offset location in the destination image memory 24, for return to the same location in the destination image memory 24. In contrast to the prior embodiment, the pixel or point data in the destination image memory 24 is then sequentially offset before each new summation by the amounts specified in accordance with columns 3 and 4 of Table I for the appropriate constant of the convolution kernel, in accordance with the Frame time. The values determined in accordance with the formulas of Table I would be the same with either the embodiment of a system in FIGS. 1 or 3, with a 3×3 convolution array as depicted in FIG. 2, except that all of the offset values would be of the opposite sign, maintaining identical relative reference to the embodiment depicted in FIG. 1.

Referring again to FIG. 2, and comparing it with the offset values in Table I, it can be seen that the offset values for Frame time 5 are 0 and 0, in the X-axis and Y-axis, respectively, that is, a zero offset. Viewing FIG. 2, it can be seen that the kernel location for element $k_{22}$, which is the element for Frame 5, is the center of the 3×3 kernel. As discussed before, the offsets before and after Frame time 5 can be related spatially to an image array of pixels of 3×3 dimension, with the convolution kernel not only providing a constant for multiplication, but providing a spatial arrangement for sequentially offsetting the pixels of the image in a given pattern. In effect, with the kernel of FIG. 2, the center kernel element $k_{22}$ spatially depicts the center pixel of an image array, which is the pixel of interest about which the offsetting of pixels for computational purposes is accomplished.

Figure 4:
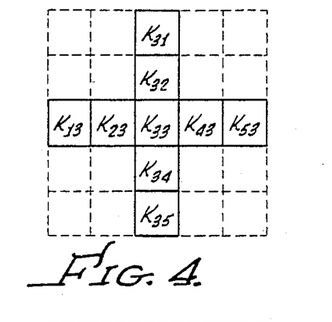
FIG. 4 is a symbolic depiction of another convolution kernel for use in the processing system of FIGS. 1 and 3.

FIGS. 4–7 symbolically depict alternate convolution kernel structures which may be employed in the systems of FIGS. 1 and 3 for other techniques used in digital image processing. In FIG. 4, the kernel shape, in solid lines, is in the form of a cruciform, with each block or element bearing a reference designation "k" with a two-digit subscript representative of the column and row location thereof. By comparing the kernel of FIG. 2 with that of FIG. 4, it can be seen that, in FIG. 4, except for the third row, there is only one constant in each of the other four rows. However, each kernel, that is, the kernel of FIG. 2 and the kernel of FIG. 4, has nine elements, corresponding to nine coefficients or kernel constant values, and corresponding to nine offsets or spatial dislocations of the source image array (or destination image array).

For the kernel of FIG. 4, however, the offsets in the X-axis and Y-axis directions will be determined in accordance with the shape of the convolution kernel, that is the orientation of each element relative to the center kernel element $k_{33}$. The following Table II is similar to Table I and correlates the kernel element constant values to the kernel element offsets according to Frame time of the kernel of FIG. 4.

TABLE II

| Frame k | | X offset (pixels) | Y offset (pixels) | $D_{i,j}(T)$ |
|---|---|---|---|---|
| 0 | — | — | — | 0 |
| 1 | $k_{31}$ | 0 | −2 | $k_{31}S_{i,j-2} = D_{i,j}(1)$ |
| 2 | $k_{32}$ | 0 | −1 | $k_{32}S_{i,j-1} + D_{i,j}(1) = D_{i,j}(2)$ |
| 3 | $k_{13}$ | +2 | 0 | $k_{13}S_{i+2,j} + D_{i,j}(2) = D_{i,j}(3)$ |
| 4 | $k_{23}$ | +1 | 0 | $k_{23}S_{i+1,j} + D_{i,j}(3) = D_{i,j}(4)$ |
| 5 | $k_{33}$ | 0 | 0 | $k_{33}S_{i,j} + D_{i,j}(4) = D_{i,j}(5)$ |
| 6 | $k_{43}$ | −1 | 0 | $k_{43}S_{i-1,j} + D_{i,j}(5) = D_{i,j}(6)$ |
| 7 | $k_{53}$ | −2 | 0 | $k_{53}S_{i-2,j} + D_{i,j}(6) = D_{i,j}(7)$ |
| 8 | $k_{34}$ | 0 | +1 | $k_{34}S_{i,j+1} + D_{i,j}(7) = D_{i,j}(8)$ |
| 9 | $k_{35}$ | 0 | +2 | $k_{35}S_{i,j+2} + D_{i,j}(8) = D_{i,j}(9)$ |

Figure 5:
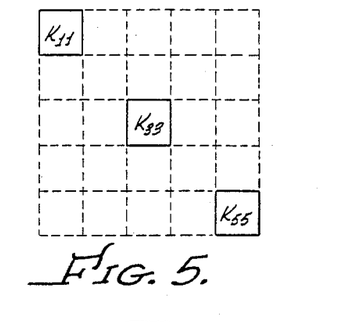
FIG. 5 is a symbolic depiction of still another convolution kernel for use in the processing system of FIGS. 1 and 3.

FIG. 5 shows an alternate kernel structure, in which the dotted line spaces intervening the discrete blocks illustrated in solid lines, may be viewed as blank spaces of one block dimension. The designations within the kernel are $k_{11}$, $k_{33}$, and $k_{55}$, with kernel element $k_{33}$ corresponding to the center of the kernel, and correspondingly to the pixel of interest of the image array in the convolution.

Figure 6:
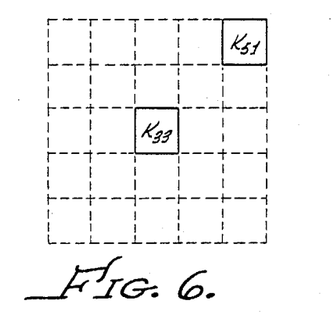
FIG. 6 is a symbolic depiction of yet another convolution kernel for use in the processing system of FIGS. 1 and 3.

FIG. 6 depicts still another kernel structure, with the kernel elements, in solid lines, designated $k_{33}$ and $k_{51}$. In the kernel structure of FIG. 7, the center kernel element is designated $k_c$, with the other kernel element in drawing designated $k_x$, with any number of intervening pixel spaces therebetween.

Figure 7:
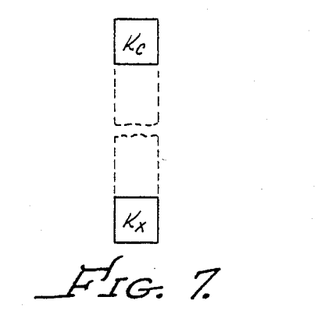
FIG. 7 is a symbolic depiction of a further convolution kernel for use in the processing system of FIGS. 1 and 3.

With respect to FIGS. 5 through 7, it is to be emphasized that nine raster frame times are not necessary for the convolution processing, since fewer than nine elements exist within the convolution kernel. In these instances, the number of frames required for convolving an image corresponds to the number of discrete elements in the kernel structure. By the use of the term "discrete element", what is meant is an element of the convolution kernel, which has associated therewith a kernel constant of a value different from "zero", that is, a non-zero value. As a consequence, the convolution kernels of FIGS. 5 through 7 require 3, 2, and 2 frame times to process, respectively. Any of these kernels may be used in either of the systems of FIGS. 1 and 3, with a single multiplier and a single summer or adder under processor control for sequential computational adjustment of the value of each pixel in the source image per frame time, with subsequent sequential offsetting and sequential adjustment.

At this point, it is to be emphasized that, although a kernel constant associated with an element of the kernel may be zero, a zero constant value for any element does not affect the result of the computational adjustments. By way of example, the kernel structure of FIG. 4 may readily be viewed as a 5×5 matrix or square arrangement of elements, with the elements depicted in cruciform configuration being those elements which contain a "non-zero" value. The other elements depicted as dotted line blocks would then contain zero values. In this instance, the computational algorithm in the control processor 14 may be set up in one of two ways. As a first method, the algorithm may be, and preferably is, structured to ignore kernel constant values of zero, in which event the number of iterations required for a convolved image is equal to the number of discrete, or non-zero, elements in the convolution kernel algorithm. Alternatively, but not preferred, the algorithm may perform a computational function in accordance with all elements in the array, including those having zero values. In either event, the minimum number of computational adjustments is equal to the number of non-zero values in the convolution kernel.

In addition, although a functional component of the system has been designated as an adder or summer 22, it is to be understood that this term refers to algebraic addition, which includes subtraction. As stated earlier, the value of a constant may be positive or negative. A negative value for a constant in the convolution kernel accordingly results in a subtraction process, or an algebraic addition of a negative value. Negative values are routinely utilized in masks or kernels for digital image processing to determine gradient differences in tone between adjacent points or pixels in the image, particularly for processing techniques where the edges of objects are of prime significance.

In a hardware system, the kernel structure employed determines the hardware configuration for accomplishing the desired transformation or convolution, and once the hardware system has been configured, it essentially becomes a dedicated system for a particular image processing function in accordance with a particular kernel size and shape. It cannot be used with a larger kernel size, and may, if at all possible, have only limited utility within the preset size for different shapes of convolution kernels. Correspondingly, the structure or number of elements in the kernel determines the number of multipliers and adders required for the hardware system.

In accordance with the present invention, in contrast to the hardware system, since only one multiplier and one adder or summer is utilized, the kernel size, shape and structure may be readily established in software within the control processor. In accordance with this invention, the system is applicable to larger kernels, non square kernels, or kernels of any arbitrary size and shape. There is, in fact, no requirement that kernels have contiguous structure, as depicted by the convolution kernel structures in FIGS. 5 through 7.

Figure 8:
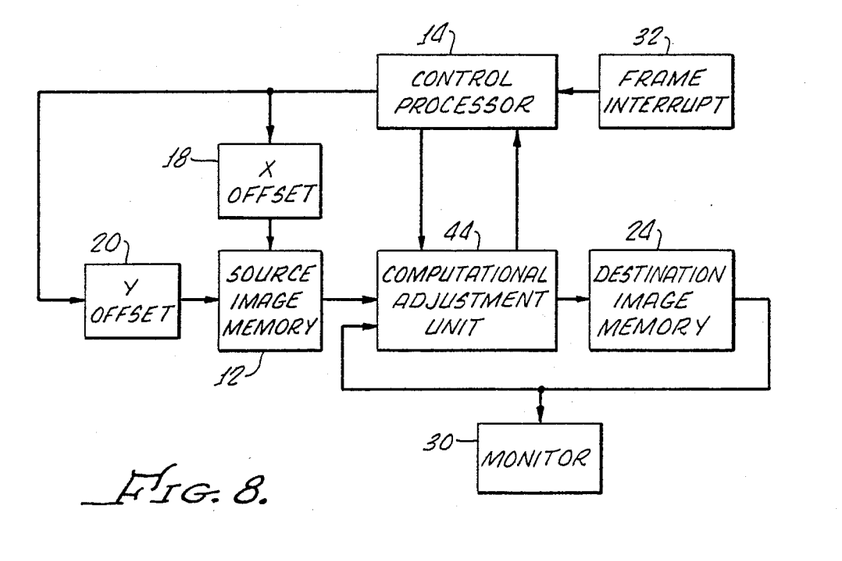
FIG. 8 is a block diagram of an alternate embodiment of the system of FIG. 1.

FIG. 8 represents, in block diagram form, an alternative image procesing technique, in which non-linear processing of the digitized pixel data may be readily accomplished in a number of raster frame times equivalent to the number of constants within the convolution kernel. By way of example, such non-linear processing may include manipulation by use of absolute values, the squaring or taking of the square root of the values, the use of trigonometric functions during the process, such as the use of sines, cosines, etc., and the use of thresholding of values above or below predetermined values. With such mathematically complex techniques, the digital pixel data may be manipulated in accordance with any of a number of digital image processing techniques.

As shown in FIG. 8, the constant register 16, the multiplier 21 and the summer 22 have been replaced by a block 44 labeled computational adjustment unit. In this embodiment, the control processor 14 is preferably a computer, such as a microprocessor, with the kernel values for the constants stored therein. In addition, the processor 44 includes means, such as a look-up table, of mathematical functions for use in manipulation of the pixel data from the source image memory 12. In addition to multiplication and summation, the above referenced text entitled *Digital Image Processing* describes numerous methods of processing digital image information utilizing absolute values, squares, square roots, first and second order differentiation, as well as higher order integration. By use of a look-up table within the processor 14, more complex and non-linear functional operations may be readily performed on the pixel data as the convolution kernel establishes the offsets and constants for data manipulation.

With the system of FIG. 8, kernel constants and linear or non-linear functional instructions can be directed from the processor 14 to computational unit 44. The data from source image memory 12 may then be computationally adjusted in unit 44 in accordance therewith, combined as needed with the adjusted data from the destination image memory 24, and the adjusted, combined data then stored in the destination image memory 24 for further iterative processing as required. As in the previously described embodiments, the total number of iterations of adjustment for a complete convolution will correspond to the number of kernel constants in the convolution kernel.

Other modifications may readily appear to one skilled in the art. By way of example, although the drawings illustrate a monitor 30 as the user of the processed content of the destination memory 24, the information can equally well be used by a computer via a direct memory access (DMA) or other standard interface. Alternatively, the destination memory can be mapped to a host computer. Furthermore, the transformed processed image may be reproduced on any display media, such as photographically sensitive paper, directly from the convolved image data through appropriate photographic control apparatus without intervention of a video display.

In addition, although the description has proceeded with reference to the raster scan of a video display arrangement, this timing sequence is illustrative, and the utilization of video processing speeds enables almost real time transformation of an image, with a slight delay due to processing time. It is to be understood, however, that what is received is simply a timing sequence which enables synchronization of the source image array and destination image array relative to each other and relative to the control processor for the computational adjustments of each point within the array, with an end of array signal for initiating the subsequent sequential resetting of the offsets and the constant for a subsequent computation, with some control over the number of iterations determined by the number of non-zero constants.

While there have been shown and described preferred embodiments, it is to be understood that various other adaptations and modification may be made within the spirit and scope of the invention.

What is claimed is:

1. Apparatus for processing digital data representative of a digital array of points of a source image comprising:
   means for providing a source image as a digital array of points;
   destination image memory means;
   control means including convolution means for establishing computational values and a spatial sequence of computational relative to each point in said array;
   computational means responsive to said control means for computationally adjusting the value of each point of said source image digital array for transfer to and combination with the value in said destination image memory means in a spatially related position;
   means for generating an end of array signal; and
   means responsive to said end of array signal for enabling said control means to revise said computational values and spatial sequence of computation relative to each point in said array for subsequent iterative processing by said computational means for a number of iterations determined by the number and values of said computational values whereby said source image is transformed into an array of values in said destination image memory means representative of a convolved image.

2. The apparatus according to claim 1 wherein said means for providing a source image includes a source image memory means.

3. The apparatus according to claim 1 wherein said means for providing a source image includes a digitizing video camera means.

4. The apparatus according to claim 1 wherein said convolution means includes a convolution kernel of a selected number of elements having a predetermined configuration of elements relative to one another indicative of offsets of point locations relative to a reference point, and a predetermined value for each element of the kernel.

5. The apparatus according to claim 4 wherein said number of iterations is at least equal to the number of non-zero values of said predetermined values in said convolution kernel.

6. The apparatus according to claim 1 wherein said convolution means includes a convolution kernel of a number of elements having a predetermined configuration of elements relative to one another indicative of spatial offsets of point locations relative to a reference point, and a predetermined value for each element of the kernel, and said control means effects offsets of the array of said source image array relative to said destination image memory means.

7. The apparatus according to claim 1 wherein said convolution means includes a convolution kernel of a number of elements having a predetermined configuration of elements relative to one another indicative of spatial offsets of point locations relative to a reference point, and a predetermined value for each element of the kernel, and said control means effects offsets of the array of said destination image memory means relative to said source image array.

8. Apparatus for convolving a source image formed as a digital array of a predetermined number of points into a transformed digital array having a corresponding number of points, said apparatus comprising:
   processor means;
   first means for providing digital data representative of each point of said source image in a digital array;

memory means for receiving the transformed digital array;

means under control of said processor means for enabling a predetermined number of selective spatial shiftings of each point of one of said source image and the transformed digital array relative to the other;

means under control of said processor means for establishing a predetermined constant value for each one of said predetermined number of spatial shiftings of points of said source image;

computational adjustment means for sequentially manipulating the value of each point of said source image by the predetermined constant value associated with the then existing spatial shifting;

combining means for combining the output of said adjusting means with a spatially related point in said memory means to obtain resultant data;

means for returning said resultant data to said memory means to said spatially related point in said memory means; and means for controlling said processor means, for initiating said spatial selection means and said constant value means, for repeating operation of each of said adjusting means and combining means, and for readjusting said resultant data a number of times determined by said predetermined number and said constant values, whereby to transform the data array of said source image from said first means into a convolved data array in said memory means.

9. The apparatus according to claim 8 wherein said first means includes a source image memory means.

10. The apparatus according to claim 9 further including video means providing an image to said source image memory means.

11. The apparatus according to claim 10 wherein said means for controlling said processor means includes means for receiving an end of array signal, and wherein said processor means is responsive to said signal for altering the spatial shifting and for altering the constant value to that value corresponding to the then existing altered spatial shifting.

12. The apparatus according to claim 8 wherein said means under control of said processor means for enabling selective spatial shifting spatially shifts the array of the first means relative to the memory means.

13. The apparatus according to claim 8 wherein said means under control of said processor means for enabling selective spatial shifting spatially shifts the array of the memory means relative to the first means.

14. The apparatus according to claim 8 wherein said first means is a source image memory means.

15. A method for processing digital data representative of a digital array of points of a source image comprising:

providing a source image as a digital array of points;
generating an end of array signal;
providing destination image memory means;
providing control means including convolution means for establishing computational values and a spatial sequence of computation relative to each point in said array;
computationally adjusting, under control of said control means, the value of each point of said source image digital array relative to a corresponding value in said destination image memory means for transfer to said destination image memory means in a spatially related position;

revising, in said control means, responsive to said end of array signal, the computational values and spatial sequence of computation relative to each point in said array; and iteratively processing, by said computational means, each point of said source image digital array, the number of iterations determined by the number and values of said computational values, whereby said source image is transformed into an array of values in said destination image memory means representative of a convolved image.

16. A method for convolving a source image formed as a digital array of a predetermined number of points into a transformed digital array having a corresponding number of points, said apparatus comprising:

providing processor means;
providing a source of digital data representative of each point of said source image in a digital array;
providing memory means for receiving the transformed digital array;
providing means under control of said processor means for enabling a predetermined number of selective spatial shiftings of each point of one of the digital array of said source image and the digital array in said memory means relative to the other;
providing means under control of said processor means for establishing a predetermined constant value for each one of said predetermined number of spatial shiftings;
sequentially multiplying each point of said source image by the predetermined constant value associated with the then existing spatial shifting;
summing the output of said multiplying means with a spatially related point in said memory means to obtain resultant data;
returning said resultant data to said memory means to said spatially related point in said memory means; and
controlling said processor means for enabling said spatial selection means and said constant value means to provide another spatial shifting and another constant value, for repeating operation of each of said multiplying means and summing means, and for readjusting said resultant data a number of times determined by said predetermined number and said constant values, whereby to transform the data array of said source image from said source of digital data into a transformed digital array in said memory means.

17. A method of processing an unprocessed source of image of digital values of points in a first matrix into a processed destination image of digital values of points in a second matrix having a corresponding number of points in correlation with the points of said source image, the method comprising:

providing a source image in digital form having digital values indicative of characteristics of each point of the source image;
establishing a convolution kernel of a selected number of kernel elements having a predetermined spatial orientation of elements relative to one another, and a predetermined constant value for each kernel element;
providing destination memory means;
establishing a timing sequence including a signal representative of transfer of all points of said first matrix;
for each said signal, computationally adjusting, in spatial relation with the spatial orientation of a given one of said elements and in accordance with the constant value of a given one of said elements, and in synchronism with said timing sequence, the digital value of each point in said first matrix for storage in said destination memory means as a second matrix in correlation with said first matrix; and for each said signal, iteratively repeating said computational adjusting for a successive one of the remainder of said spatial orientation and constant value of said kernel elements for providing a processed destination image in a second matrix in correlation with said source image.

18. The method according to claim 17 wherein said step of computationally adjusting includes multiplying each point of the source image by the constant value associated with the spatial orientation of the element, summing the result with the digital value in a spatially related point in the destination memory means, and returning the resultant value to the spatially related point in the destination memory means.

19. The method according to claim 18 wherein the step of providing a source image includes providing a source image via a video camera and the step of establishing a timing sequence establishes a timing sequence at video processing speeds.

20. The method according to claim 19 wherein said signal is a video vertical retrace signal and each iterative computational adjustment is accomplished during one video frame.

21. A convolution processor for processing an image comprising:

means for providing a source image having a digital array of pixels, each having a pixel value;

means for providing a destination memory for receiving and storing an array of adjusted values in correlation with said source image;

control means including means for establishing a convolution kernel with a number of kernel elements, each having a kernel element value and a kernel element offset;

computational means responsive to said control means for performing adjustments to the values of each pixel of said source image including:

(a) effecting offset of each pixel of said source image relative to each corresponding location of said destination memory according to the offsets of a first one of said kernel elements;

(b) adjusting the value of each pixel of said source image according to the kernel element value of said first kernel element, to provide a first adjusted value for each such relatively shifted pixel;

(c) combining the adjusted value of each adjusted and relatively shifted pixel with a value in a related pixel location of said destination memory;

(d) storing the combined value at said related pixel location in said destination memory; and iterative means responsive to adjustment of the array of shifted pixels for causing said computational means to perform said pixel adjustments on each subsequently shifted array for each successive kernel element value and kernel element offset, the number of iterations being determined by the number of kernel elements and the kernel element values, whereby after such number of iterations, said destination memory has stored therein an array of adjusted pixel values in correlation with said digital array of said source image.

22. A method for processing an image comprising:

providing a source image having a digital array of pixels, each having a pixel value;

providing a destination memory for receiving and storing an array of adjusted values in correlation with said source image;

providing control means including means for establishing a convolution kernel with a number of kernel elements, each having a kernel element value and a kernel element offset;

providing computational means responsive to said control means for performing adjustments to the values of each pixel of said source image including:

(a) shifting of each pixel of said source image relative to each corresponding location of said destination memory according to the offsets of a first one of said kernel elements;

(b) adjusting the value of each pixel of said source image according to the kernel element value of said first kernel element, to provide a first adjusted value for each such relatively shifted pixel;

(c) combining the adjusted value of each adjusted and relatively shifted pixel with a value in a related pixel location of said destination memory;

(d) storing the combined value at said related pixel location in said destination memory; and iteratively repeating said steps of offsetting, adjusting, combining and storing, in response to adjustment of the array of shifted pixels for causing said computational means to perform said pixel adjustments on each subsequently shifted array for each successive kernel element value and kernel element offset, the number of iterations being determined by the number of kernel elements and the kernel element values, whereby, after such number of iterations, said destination memory has stored therein an array of adjusted pixel values in correlation with said digital array of said source image.

23. A method for processing digital data representative of a digital array of points of a source image comprising:

providing a source image as a digital array of points;

generating end of array signals;

providing destination image memory means;

establishing a group of computational values and a spatial sequence of computation relative to each point in said array;

employing said values and spatial sequence to computationally adjust the value of each point of said source image digital array relative to the value of a corresponding point in said destination image memory means;

transferring the adjusted values of each point of said source image digital array to said destination image memory means in a spatially related position;

revising, in response to each one of the end of array signals, the group of computational values and spatial sequence of computation relative to each point in said array;

employing the revised group of computational values and spatial sequences of computation to computationally adjust each point of said source image digital array, and repeating said revising and computational adjusting of the value of each point of said source image digital array for a number of iterations determined by the number and values of said computational values, whereby said source image is transformed into an array of values in said destination image memory means representative of a convolved image.

* * * * *